United States Patent [19]

Tojo et al.

[11] Patent Number: 5,278,204
[45] Date of Patent: Jan. 11, 1994

[54] HEAT-RESISTANT RUBBER COMPOSITIONS

[75] Inventors: Tetsuo Tojo, Ichihara; Katsuo Okamoto, Funabashi; Akira Matsuda, Ichihara; Eckhart Louis, Tokyo, all of Japan

[73] Assignee: Mitsui Petrochemical Industries, Ltd., Tokyo, Japan

[21] Appl. No.: 975,955

[22] Filed: Nov. 13, 1992

Related U.S. Application Data

[63] Continuation of Ser. No. 884,855, May 11, 1992, abandoned, which is a continuation of Ser. No. 260,263, Oct. 20, 1988, abandoned.

[30] Foreign Application Priority Data

| | | | |
|---|---|---|---|
| Oct. 20, 1987 | [JP] | Japan | 62-262583 |
| Oct. 20, 1987 | [JP] | Japan | 62-262584 |
| Oct. 20, 1987 | [JP] | Japan | 62-262585 |
| Oct. 20, 1987 | [JP] | Japan | 62-262586 |

[51] Int. Cl.$^5$ ............................................. C08K 9/06
[52] U.S. Cl. ................................. 523/212; 523/213; 524/267; 524/269
[58] Field of Search ............... 523/212, 213; 524/267, 524/269

[56] References Cited

U.S. PATENT DOCUMENTS

| | | | |
|---|---|---|---|
| 3,795,646 | 3/1974 | MacKenzie, Jr. et al. | 524/269 |
| 4,764,546 | 8/1988 | Mitsuno et al. | 523/213 |

FOREIGN PATENT DOCUMENTS

| | | |
|---|---|---|
| 116739 | 9/1981 | Japan. |
| 120744 | 9/1981 | Japan. |
| 195757 | 12/1982 | Japan. |

*Primary Examiner*—Melvyn I. Marquis
*Attorney, Agent, or Firm*—Sherman and Shalloway

[57] ABSTRACT

Disclosed is a heat-resistant rubber composition comprising (A) 100 parts by weight of an ethylene/α-olefin copolymer or a modified ethylene/α-olefin copolymer formed by graft-copolymerization with at least one compound selected from the group consisting of unsaturated carboxylic acids and anhydrides and esters thereof, and (B) (i) 10 to 100 parts by weight of a silica type filler which has been treated with a silane compound represented by the following formula:

$$R^1-\underset{\underset{OR^2}{|}}{\overset{\overset{OR^2}{|}}{Si}}-OR^2 \tag{I}$$

wherein $R^1$ stands for an alkenyl group, a chloroalkenyl group or a chloroalkyl group, and $R^2$ stands for a lower alkyl group, or (ii) a combination of 10 to 100 parts by weight of said silane-treated silica type filler or an untreated silica type filler and 0.5 to 30 parts by weight of a polyorganosiloxane having an average composition represented by the following formula:

$$(R^3)_a(R^4)_b SiO_{(4-a-b)/2} \tag{II}$$

wherein $R^3$ stands for a monovalent saturated or unsaturated hydrocarbon group, $R^4$ stands for a chloroalkyl group or an alkenyl group, a is a number of from 1 to 2.5 and b is a number of from 0.01 to 1.2, with the proviso that the sum of a and b is in the range of from 1.8 to 3.

4 Claims, No Drawings

HEAT-RESISTANT RUBBER COMPOSITIONS

This application is a continuation of application Ser. No. 07/884,855, filed May 11, 1992, now abandoned, which is a continuation of application Ser. No. 07/260,263, filed Oct. 20, 1988, now abandoned.

BACKGROUND OF THE INVENTION

(1) Field of the Invention

The present invention relates to a heat-resistant rubber composition. More particularly, the present invention relates to a rubber composition comprising a modified or unmodified ethylene/α-olefin copolymer rubber and a specific silane-treated silica type filler or a combination of a silane-treated or untreated silica type filler and a specific polyorganosiloxane, which gives a cured rubber excellent in mechanical properties, resistance to heat aging and electric properties.

(2) Description of the Prior Art

An ethylene/α-olefin copolymer rubber is widely used as a rubber having excellent mechanical properties and electrically insulating properties for car parts, electric parts, ordinary industrial parts, and the like. Recently, a high resistance against heat aging is often required for car parts, electric parts and the like.

Accordingly, as is shown in Complete Book of Synthetic Rubber Processing Techniques, "Ethylene-Propylene Rubber", addition of antioxidants to rubbers of this type has been tried, but no satisfactory improvement effect can be attained.

A composition comprising an ethylene/α-olefin copolymer and a silica type filler has been used in various fields where a rubber is ordinarily used. It is known that if a silica type filler is surface-treated with trimethylchlorosilane or the like, a hydrophobic property can be imparted, and this silane-treated silica type filler is incorporated in an ethylene/α-olefin copolymer.

A composition of this type is excellent in the initial physical properties, but the aging resistance is still insufficient.

It has already been known that reinforcing silica and an organopolysiloxane are incorporated in an ethylene/α-olefin copolymer such as EPR. For example, Japanese Patent Application Laid-Open Specification No. 116739/81 and Japanese Patent Application Laid Open Specification No. 120744/81 teach that organochlorosilane-treated silica and an organopolysiloxane such as dimethylpolysiloxane are incorporated in EPR, and Japanese Patent Application Laid-Open Specification No. 195757/82 teaches that finely divided silica and an organopolysiloxane are incorporated in EPR.

SUMMARY OF THE INVENTION

We found that if a silica type filler which has been treated with a trialkoxysilane having an alkenyl group, a chloroalkenyl group or a chloroalkyl group is incorporated in an ethylene/α-olefin copolymer rubber or a combination of this silane-treated silica type filler or an untreated silica type filler and an organopolysiloxane having a chloroalkyl group is incorporated in an ethylene/α-olefin copolymer rubber, the heat aging resistance of the rubber is highly improved.

It is therefore a primary object of the present invention to improve the heat aging resistance of an ethylene/α-olefin copolymer rubber without degradation of excellent mechanical properties and electrically insulating properties.

Another object of the present invention is to provide a rubber composition which gives a cured rubber showing high strength and elongation retention ratios even under heat aging conditions.

More specifically, in accordance with the present invention, there is provided a heat-resistant rubber composition comprising (A) 100 parts by weight of an ethylene/α-olefin copolymer or a modified ethylene/α-olefin copolymer formed by graft-copolymerization with at least one compound selected from the group consisting of unsaturated carboxylic acids and anhydrides and esters thereof, and (B) (i) 10 to 100 parts by weight of a silica type filler which has been treated with a silane compound represented by the following formula:

wherein $R^1$ stands for an alkenyl group, a chloroalkenyl group or a chloroalkyl group, and $R^2$ stands for a lower alkyl group, or (ii) a combination of 10 to 100 parts by weight of said silane-treated silica type filler or an untreated silica type filler and 0.5 to 30 parts by weight of a polyorganosiloxane having an average composition represented by the following formula:

wherein $R^3$ stands for a monovalent saturated or unsaturated hydrocarbon group, $R^4$ stands for a chloroalkyl group or an alkenyl group, a is a number of from 1 to 2.5 and b is a number of from 0.01 to 1.2, with the proviso that the sum of a and b is in the range of from 1.8 to 3.

In the present invention, by incorporating a silica type filler treated with a specific silane coupling agent represented by the formula (I) into an ethylene/α-olefin copolymer rubber, the heat aging resistance of the rubber is prominently improved.

More specifically, as is apparent from the examples given hereinafter, in the composition of the present invention, the strength and elongation retention ratios after the test conducted at 180° C. for 96 hours are at least 68%, generally at least 70%, preferably at least 87%. Ordinarily, the heat resistance is carried out at 140° C., and if the retention ratio is at least 70% at this test, it is judged that the composition is heat-resistant. The superiority of the composition of the present invention will be readily understood from this fact.

The reason why the heat aging resistance is prominently improved in the present invention has not been completely elucidated. However, it is considered that this effect may probably be due to a prominent improvement of the interface between the filler and the ethylene/α-olefin copolymer rubber.

The above-mentioned effect of the present invention can be similarly attained when a combination of a silane-modified or unmodified silica type filler and an organopolysiloxane represented by the formula (II) is incorporated.

DETAILED DESCRIPTION OF THE PREFERRED EMBODIMENTS (A) Ethylene/α-Olefin Copolymer Rubber The ethylene/α-olefin copolymer rubber used as the base polymer in the composition of the present invention is a copolymer of ethylene with at least one member selected from α-olefins having 3 to 10 carbon atoms, such as propylene, 1-butene, 1-pentene, 1-hexene, 4-methyl-1-pentene, 1-octene and 1-decene. The ethylene content is generally 50 to 95 mole % and preferably 60 to 92 mole %.

The ethylene/α-olefin copolymer rubber may further comprise at least one polyene component.

As specific examples of the polyene component, there can be mentioned linear unconjugated dienes such as 1,4-hexadiene, 1,6-octadiene, 2-methyl-1,5-hexadiene, 6-methyl-1,5-heptadiene and 7-methyl-1,6-octadiene, cyclic unconjugated dienes such as cyclohexadiene, dicyclopentadiene, methyltetrahydroindene, 5-vinyl-norbornene, 5-ethylidene-2-norbornene, 5-methylene-2-norbornene, 5-isopropylidene-2-norbornene and 6-chloromethyl-5-isopropenyl-2-norbornene, and trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene. Cyclic unconjugated dienes and 1,4-hexadiene are preferred, and dicyclopentadiene and 5-ethylidene-2-norbornene are especially preferred. The polyene component is copolymerized in such an amount that the iodine value of the formed copolymer is up to 30, preferably up to 20.

A copolymer having an intrinsic viscosity [η] of 0.5 to 4.0 dl/g, especially 1.0 to 3.5 dl/g, as measured at 135° C. in decalin is preferably used.

If the intrinsic viscosity [η] is too small and below the above-mentioned range, the obtained rubber composition is insufficient in the mechanical properties, and if the intrinsic viscosity [η] exceeds the above-mentioned range, the processability is often degraded.

The ethylene/α-olefin copolymer rubber may be one graft-copolymerized with an unsaturated carboxylic acid or a derivative (for example, an anhydride or ester) thereof. If this modified ethylene/α-olefin copolymer rubber is used, the tensile strength of the final cured rubber can be further improved over the tensile strength attained when the unmodified rubber is used. Moreover, the tensile strength and elongation retention ratios under heat aging conditions can be further improved.

The following compounds can be mentioned as examples of the unsaturated carboxylic acid and its anhydride and ester to be graft-copolymerized to the ethylene/α-olefin copolymer rubber, though compounds that can be used in the present invention are not limited to the compounds described below. Unsaturated Carboxylic Acids.

Acrylic acid, methacrylic acid, maleic acid, fumaric acid, itaconic acid, citraconic acid, tetrahydrophthalic acid and bicyclo(2,2,1)-hepto-2-ene-5,6-dicarboxylic acid. Unsaturated Carboxylic Anhydrides Maleic anhydride, itaconic anhydride, citraconic anhydride, tetrahydrophthalic anhydride and bicyclo(2,2,1)-hepto-2-ene-5,6-dicarboxylic anhydride.

Among them, maleic anhydride is especially preferred. Unsaturated Carboxylic Acid Esters Methyl acrylate, methyl methacrylate, dimethyl maleate, monomethyl maleate, diethyl fumarate, dimethyl itaconate, diethyl citraconate, dimethyl tetrahydrophthalate and dimethyl bicyclo(2,2,2)hepto-2-ene-5,6-dicarboxylate.

Among them, methyl acrylate and ethyl acrylate are preferred.

These unsaturated carboxylic acids and derivatives are used singly or in the form of mixtures of two or more of them as the grafting comonomer. At any rate, it is preferred that the unsaturated carboxylic acid or derivative be graft-copolymerized in an amount of 0.1 to 10 parts by weight, especially 0.2 to 5 parts by weight, per 100 parts by weight of the ethylene/α-olefin copolymer rubber.

If the amount of the grafted comonomer is too small and below the above-mentioned range, the intended further improvement of the strength or the heat aging-resistance is hardly attained. If the amount of the grafted comonomer exceeds the above-mentioned range, the obtained rubber composition tends to be insufficient in the processability or the cold resistance.

The graft copolymerization is accomplished by reacting the ethylene/α-olefin copolymer rubber with the unsaturated carboxylic acid or its derivative in the presence of a radical initiator.

The reaction can be carried out in the state of a solution or in the molten state. If the reaction is carried out in the molten state, a highest efficiency can be attained by performing the reaction in a continuous manner in an extruder.

A radical initiator having such a property that the decomposition temperature giving a half-value period of 1 minute is 150° to 270° C. is preferably used for the grafting reaction.

As typical instances, there can be mentioned organic peroxides and organic peresters such as benzoyl peroxide, dichlorobenzoyl peroxide, dicumyl peroxide, di-tert-butyl peroxide, 2,5-dimethyl-2,5-di(peroxybenzoate)hexine-3,1,4-bis(tert-butylperoxyisopropyl)benzene, lauroyl peroxide, tert-butyl peracetate, 2,5-dimethyl-2,5-di(tert-butylperoxy)hexine-3,2,5-dimethyl-2,5-di(tert-butylperoxy)hexane, tert-butyl perbenzoate, tert-butylperphenyl acetate, tert-butyl per-sec-octoate, tert-butyl perpivalate, cumyl perpivalate and tert-butyl perdiethylacetate.

In view of the mechanical properties and processability, a modified or unmodified ethylene/α-olefin copolymer rubber having a Mooney viscosity [$ML_{1+4}$ (100° C.)] of 5 to 180, especially 10 to 120, is preferred.

(B) Silane-Treated Silica Type Filler

A silane compound represented by the following formula:

wherein $R^1$ stands for an alkenyl group, a chloroalkenyl group or a chloroalkyl group, preferably an allyl group, a vinyl group or a chloropropyl group, and $R^2$ stands for a lower alkyl group, for example, a methyl group or an ethyl group, is used as the silane coupling agent for the silane treatment of the silica type filler. As specific examples, there can be mentioned allyltrimethoxysilane, allyltriethoxysilane, vinyltrimethoxysilane, vinyltriethoxysilane, chloropropyltrimethoxysilane and chloropropyltriethoxysilane, though silane coupling agents that can be used are not limited to the compounds exemplified above.

All of known silica type fillers can be used as the filler to be silane-treated. For example, dry method silica, wet method silica, synthetic silicate type white carbon, talc and clay are preferably used. Among these silica type fillers, dry method silica having a BET specific area of 50 to 400 m²/g, especially 100 to 300 m²/g, is especially preferred for attaining the objects of the present invention. Among various silica type fillers, dry method silica has a relatively low silanol group content, and if this silica is treated with the above-mentioned silane, the silanol group is blocked and it is considered that the silica is effectively bonded to the rubber through the functional group of the silane.

The treatment amount of the silane coupling agent represented by the above-mentioned formula (I) is 0.1 to 5% by weight, preferably 0.5 to 4% by weight, especially preferably 1 to 3% by weight, as the carbon content based on the treated filler.

If the treatment amount of the silane coupling agent is too small, the desired heat aging resistance cannot be attained, and use of too large an amount of the silane coupling agent results in economical disadvantages.

If the silane-treated silica type filler is used, the heat aging resistance is prominently improved, and furthermore, since the bulk specific gravity of the filler is increased, kneading of the ethylene/α-olefin copolymer rubber with the filler can be performed smoothly. Accordingly, the silane treatment is industrially significant.

The silane coupling agent treatment is performed by known means.

For example, there can be mentioned a method in which the silica type filler and the silica compound are continuously supplied in parallel and are reacted in a treatment chamber comprising a vertical tubular furnace, as disclosed in Japanese Patent Publication No. 17049/66, and a method in which the silica type filler is contacted with the silica compound at a relatively low temperature, a high-temperature treatment is then carried out and a drying treatment with an inert gas is further carried out, as disclosed in Japanese Patent Publication No. 6379/85.

The carbon content of the silane-treated silica type filler is measured according to the following procedures.

More specifically, the silane-treated silica type filler is sufficiently dried in a current of nitrogen gas maintained at 150° C. and the carbon content is then measured by an elementary analysis meter.

It should be understood that in the special embodiment of the present invention where the chloroalkyl group-containing polyorganosiloxane is used, the untreated silica type filler can also be used.

(C) Polyorganosiloxane

In the present invention, a polyorganosiloxane having an average composition represented by the following formula (II) is used as the organopolysiloxane:

wherein $R^3$ stands for a monovalent hydrocarbon group, especially a lower alkyl group or a phenyl group, $R^4$ stands for a chloroalkyl group or an alkenyl group, a is a number of from 1 to 2.5 and b is a number of from 0.01 to 1.2, especially from 0.05 to 1.0, with the proviso that the sum of a and b is in the range of from 1.8 to 3. A polyorganosiloxane of the formula (I) in which $R^1$ is a methyl group or a phenyl group is preferably used. Furthermore, a chloroalkyl group having 3 to 8 carbon atoms, such as a γ-chloropropyl group or a γ-chloropropyl group, or an alkenyl group having 2 to 8 carbon atoms, such as a vinyl group or an allyl group, is preferred as $R^2$ in the formula (II).

The number average molecular weight (Mn) of the polyorganosiloxane is $10^2$ to $10^6$, preferably $10^3$ to $10^5$, most preferably $5 \times 10^3$ to $5 \times 10^4$.

If the polymerization degree exceeds the above-mentioned range, the polyorganosiloxane is not sufficiently compatible with the ethylene/α-olefin copolymer rubber, and hence, reduction of the strength is caused. If the polymerization degree is below the above-mentioned range, the desired heat aging resistance is hardly obtained.

(D) Recipe

In the rubber composition according to one embodiment of the present invention, 10 to 100 parts by weight, preferably 15 to 80 parts by weight, especially preferably 20 to 60 parts by weight, of at least one silica type filler (B) treated with a specific silane coupling agent as mentioned above is incorporated in 100 parts by weight of the modified or unmodified ethylene/α-olefin copolymer rubber (A).

If the amount incorporated of the silane-treated silica type filler is below or beyond the above-mentioned range, the mechanical properties, such as the tensile strength and the elongation, of the cured rubber become insufficient, and the heat aging resistance is not satisfactory.

In the rubber composition according to another embodiment of the present invention, 0.5 to 30 parts by weight, preferably 1 to 25 parts by weight, especially preferably 1.5 to 20 parts by weight, of a specific polyorganosiloxane (C) as mentioned above is incorporated in 100 parts by weight of the modified or unmodified ethylene/α-olefin copolymer (A), and 10 to 100 parts by weight, preferably 15 to 80 parts by weight, especially preferably 20 to 60 parts by weight, of a silica type filler (B) treated with a specific silane coupling agent as mentioned above or an untreated silica type filler is further incorporated.

If the amount of the polyorganosiloxane (C) is too small and below the above-mentioned range, the described heat aging resistance cannot be obtained, and if the amount of the polyorganosiloxane (C) is too large and exceeds the above-mentioned range, the desired strength cannot be obtained and the composition becomes expensive. Accordingly, use of the polyorganosiloxane (C) in too small an amount or too large an amount is not practically preferred. Furthermore, if the amount of the silica type filler (B) treated with the silane coupling agent is too small or too large, the desired strength is not obtained, and use of the silane-treated silica type filler (B) in too small an amount or too large an amount is not practically preferred.

Preferred combinations of the respective components are described in detail in the examples given hereinafter.

Known additives such as rubber reinforcers, softeners, curing agents and curing assistants can be incorporated in the rubber composition of the present invention according to the intended use of the cured product.

In the present invention, it is preferred that the total amount of the above-mentioned components (A) through (C) be at least 60% by weight, especially at least 80% by weight, based on the whole composition, though the total amount is changed according to the intended use or the like.

As the rubber reinforcer, there can be mentioned carbon blacks such as SRF, GPF, FEF, ISAF, SAF, FT and MT.

The amount of the rubber reinforcer is appropriately decided according to the intended use, but it is preferred that the amount of the rubber reinforcer be up to 50 parts by weight, especially up to 30 parts by weight, per 100 parts by weight of the total amount of the components (A) through (C).

A softener customarily used for ordinary rubbers is satisfactorily used as the softener in the present invention. For example, there can be mentioned petroleum type softeners such as process oil, lubricating oil, synthetic lubricating oil, paraffin, liquid paraffin, petroleum asphalt and vaseline, coal tar type softeners such as coal tar and coal tar pitch, fat oil type softeners such as castor oil, linseed oil, rape oil and coconut oil, waxes such as bees wax, carnauba wax and lanoline, tall oil, factice, fatty acids and fatty acid salts such as ricinoleic acid, palmitic acid, barium stearate, calcium stearate and zinc laurate, synthetic polymeric substances such as petroleum resin, atactic polypropylene, coumarone-indene resin and polyester resin, ester type plasticizers such as dioctyl adipate and dioctyl phthalate, and microcrystalline wax and rubber substitute (factice).

The amount incorporated of the softener is appropriately decided according to the intended use and the like, but it is preferred that the amount of the softener be up to 50 parts by weight, especially up to 30 parts by weight, per 100 parts by weight of the total amount of the above-mentioned components (A) through (C).

The cured product from the composition of the present invention can be prepared by forming an uncured rubber compound according to the method described below, molding the rubber compound into a desired shape and curing the rubber compound, as in case of curing of ordinary rubbers. Curing can be accomplished by a method using a curing agent and a method comprising irradiation with electron beams.

Sulfur compounds and organic peroxides can be used as the curing agent. As the sulfur compound, there can be mentioned sulfur, sulfur chloride, sulfur dichloride, morpholine disulfide, alkylphenol disulfide, tetramethylthiuram disulfide and selenium dimethylthiocarbamate. Use of sulfur is especially preferred. The sulfur compound is used in an amount of 0.1 to 10 parts by weight, preferably 0.5 to 5 parts by weight, per 100 parts by weight of the modified or unmodified ethylene/α-olefin copolymer rubber (A). As the organic peroxide, there can be mentioned dicumyl peroxide, 2,5-dimethyl-2,5-di(tert-butylperoxy)hexane, 2,5-dimethyl-2,5-di(benzoylperoxy)hexane, 2,5-dimethyl-2,5-di(tert-butylperoxy)hexine-3,5-di-tert-butyl peroxide, di-tert-butylperoxy-3,3,5-trimethylcyclohexane and tert-butyl hydroperoxide. Among them, dicumyl peroxide, di-tert-butyl peroxide and di-tert-butylperoxy-3,3,5-trimethylcyclohexane are preferably used. The organic peroxide is used in an amount of $3 \times 10^{-4}$ to $5 \times 10^{-2}$ molar part, preferably $1 \times 10^{-3}$ to $3 \times 10^{-2}$ molar part, per 100 parts by weight of the ethylene/α-olefin copolymer rubber (A).

When a sulfur compound is used as the curing agent, it is preferred that a curing promoter be used in combination. As the curing promoter, there can be mentioned thiazole type curing promoters such as N-cyclohexyl-2-benzothiazole-sulfenamide, N-oxydiethylene-2-benzothiazole-sulfenamide, N,N-diisopropyl-2-benzothiazole-sulfenamide, 2-mercaptobenzothiazole, 2-(2,4-dinitrophenyl)mercaptobenzothiazole, 2-(2,6-diethyl-4-morpholinothio)benzothiazole and dibenzothiazyldisulfide, guanidine type promoters such as diphenylguanidine, triphenylguanidine, di-o-tolylguanidine, o-tolyl biguanide, and diphenylguanidine phthalate, aldehyde-amine or aldehyde-ammonia type promoters such as acetaldehyde/aniline reaction product, butylaldehyde/aniline condensate, hexamethylene tetraamine and acetaldehyde ammonia, imidazoline type promoters such as 2-mercaptoimidazoline, thiourea type promoters such as thiocarbanilide, diethylthiourea, dibutylthiourea, trimethylthiourea and di-o-tolylthiourea, thiuram type promoters such as tetramethylthiuram monosulfide, tetramethylthiuram disulfide, tetraethylthiuram disulfide, tetrabutylthiuram disulfide and pentamethylenethiuram tetrasulfide, dithioacid salt type promoters such as zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium diethyldithiocarbamate, xanthate type promoters such as zinc dibutylxanthate, and other promoters such as zinc flower. The curing promoter is used in an amount of 0.1 to 20 parts by weight, preferably 0.2 to 10 parts by weight, per 100 parts by weight of the ethylene/α-olefin copolymer rubber.

When an organic peroxide is used as the curing agent, it is preferred that a curing assistant be used in combination. As the curing assistant, there can be mentioned sulfur, quinone dioxime type assistants such as p-quinone dioxime, methacrylate type assistants such as polyethylene glycol dimethacrylate, allyl type assistants such as diallyl phthalate and triallyl cyanurate, maleimide type assistants, and other assistants such as divinylbenzene. The curing assistant is used in an amount of 0.5 to 2 moles, preferably about 1 mole, per mole of the organic peroxide.

In the case where electron beams are used for curing instead of curing agents, electron beams having an energy of 0.1 to 10 MeV (megaelectron volts), preferably 0.3 to 2.0 MeV, are applied to a shaped uncured rubber compound described below so that the quantity of absorbed beams is 0.5 to 35 Mrad (megarads), preferably 0.5 to 10 Mrad. In this case, the above-mentioned curing assistant to be used in combination with the organic peroxide as the curing agent can be used. The amount of the curing assistant is $1 \times 10^{-4}$ to $1 \times 10^{-1}$ molar part, preferably $1 \times 10^{-3}$ to $3 \times 10^{-2}$ molar part, per 100 parts by weight of the ethylene/α-olefin copolymer rubber (A). Furthermore, a colorant, an antioxidant, a dispersant and a flame retardant can be incorporated into the composition of the present invention according to need.

(E) Preparation of Rubber Composition

An uncured rubber compound of the composition of the present invention is prepared according to the following method.

More specifically, the ethylene/α-olefin copolymer rubber (A), the silica type filler (B) treated with the silane coupling agent, optionally with the polyorganosiloxane (C), and if necessary, the rubber reinforcer and the softener are kneaded at a temperature of 80° to 170° C. for 3 to 10 minutes by using a mixer such as a Banbury mixer. The curing agent and if necessary, the curing promoter or the curing assistant are further added by using a roll such as an open roll, the mixture is kneaded at a roll temperature of 40° to 80° C. for 5 to 30 minutes, and the kneaded mixture is recovered dividedly and formed into a ribbon- or sheet-shaped rubber compound.

The so-prepared rubber compound is molded into an intended shape by an extrusion molding machine, a calender roll or a press. Simultaneously with or after the molding operation, the rubber compound is introduced into a curing tank and heated at 150° to 270° C. for 1 to 30 minutes or the rubber compound is irradiated with electron beams according to the above-mentioned method, whereby a cured product is obtained. This curing can be used by or without using a mold. In the case where a mold is not used, the molding and curing operations are ordinarily conducted in a continuous manner.

In the case where curing is effected by irradiation with electron beams, a rubber compound free of a curing agent is used.

Heating in the curing tank can be effected by hot air, a glass bead fluidized bed, UHF (ultra-high frequency electromagnetic wave), steam and the like.

As shown in the examples given hereinafter, the so-prepared rubber composition of the present invention is excellent in mechanical properties, electrically insulating property and heat aging resistance, and is advantageously used for the production of a wire cover, a tube, a belt, a rubber roll, a gasket, a packing, a rubber hose and the like.

The present invention will now be described in detail with reference to the following examples that by no means limit the scope of the invention.

EXAMPLE 1

A rubber composition was prepared by using the following ethylene/α-olefin copolymer rubber (A) and silane-treated silica type filler (B) according to the following recipe.

Ethylene/α-olefin copolymer rubber ethylene content: 68 mole %
α-olefin: propylene
$[\eta]$: 1.8
iodine value: 5 (ethylidene-norbornene)

Silane-treated silica (B)

silica: dry method silica having specific surface area of 200 m$^2$/g
silane coupling agent: chloropropyltrimethoxysilane
treatment amount (carbon content): 2.0% by weight Recipe ethylene/α-olefin copolymer rubber: 100.0 parts by weight
silane-treated silica: 30.0 parts by weight
stearic acid: 2.0 parts by weight
zinc flower: 5.0 parts by weight
organic peroxide[1]: 5.0 parts by weight
sulfur: 0.2 part by weight
antioxidant MB[2]: 2.0 parts by weight
antioxidant 200[3]: 1.0 part by weight Note
1) Mitsui DCP 40C supplied by Mitsui Petrochemical
2) 2-mercaptobenzimidazole supplied by Ouchi Shinko
3) 2,6-di-tert-butyl-4-methylphenol supplied by Ouchi Shinko Kneading was carried out at 60° to 70° C. for 20 minutes by an 8-inch open roll. Then, the mixture was press-cured at 170° C. for 10 minutes to form a cured sheet having a thickness of 2 mm, and the sheet was used for the measurement.

The following properties were measured according to the method of JIS K-6301.

Normal State Physical Properties tensile strength (TB) and elongation (EB)
Heat aging resistance (heat aging conditions: 180° C.×96 hours)
tensile strength retention ratio AR(TB) and
elongation retention ratio AR(EB)

The obtained results are shown in Table 1.

EXAMPLE 2

The procedures of Example 1 were repeated in the same manner except that the following ethylene/α-olefin copolymer rubber was used.

ethylene content: 80 mole %
α-olefin: propylene
$[\eta]$: 1.5

EXAMPLE 3

The procedures of Example 1 were repeated in the same manner except that the following ethylene/α-olefin copolymer rubber was used.

ethylene content: 80 mole %
α-olefin: propylene
$[\eta]$: 1.5
iodine value 3 (vinylnorbornene)

EXAMPLE 4

The procedures of Example 1 were repeated in the same manner except that the following ethylene/α-olefin copolymer rubber was used.

ethylene content: 90 mole %
α-olefin: 1-butene
$[\eta]$: 1.3

COMPARATIVE EXAMPLE 1

The procedures of Example 1 were repeated in the same manner except that the untreated silica was used instead of the silane-treated silica.

EXAMPLE 5

The procedures of Example 1 were repeated in the same manner except that the following silane-treated silica was used.

silica: dry method silica having specific surface area of 200 m$^2$/g
silane coupling agent: vinyltrimethoxysilane
treatment amount (carbon content): 2.5% by weight.

EXAMPLE 6

The procedures of Example 1 were repeated in the same manner except that the following silane-treated silica was used.

silica: dry method silica having specific surface area of 200 m$^2$/g
silane coupling agent: allyltrimethoxysilane treatment amount (carbon content): 3.0% by weight.

EXAMPLE 7

The procedures of Example 1 were repeated in the same manner except that the treatment amount of the silane-treated silica was changed to a carbon content of 0.5% by weight.

EXAMPLE 8

The procedures of Example 1 were repeated in the same manner except that the treatment amount of the silane-treated silica was changed to a carbon content of 3.5% by weight.

EXAMPLE 9

The procedures of Example 2 were repeated in the same manner except that a modified ethylene/α-olefin copolymer rubber obtained by modifying the ethylene/α-olefin copolymer rubber used in Example 2 with maleic anhydride was used.

maleic anhydride content: $5 \times 10^{-3}$ mole per 100 g of copolymer rubber.

EXAMPLE 10

The procedures of Example 9 were repeated in the same manner except that the following silane-treated silica was used.
silica: dry method silica having specific surface area of 200 m$^2$/g
silane coupling agent: vinyltrimethoxysilane
treatment amount (carbon content): 2.5% by weight.

EXAMPLE 11

The procedures of Example 9 were repeated in the same manner except that the following silane-treated silica was used.
silica: dry method silica having specific surface area of 200 m$^2$/g
silane coupling agent: allyltrimethoxysilane
treatment amount (carbon content): 3.0% by weight.

EXAMPLE 12

The procedures of Example 4 were repeated in the same manner except that a modified ethylene/α-olefin copolymer rubber obtained by modifying the ethylene/α-olefin copolymer rubber used in Example 4 with ethyl acrylate was used.
ethyl acrylate content: $10^{-2}$ mole % per 100 g of copolymer rubber.

EXAMPLE 13

The procedures of Example 1 were repeated in the same manner except that the following ethylene/α-olefin copolymer rubber was used and the recipe was changed as indicated below.

Ethylene/α-olefin copolymer rubber ethylene content: 70 mole %
α-olefin: propylene
[η]: 2.7
iodine value: 10 (ethylidene-norbornene)

Recipe ethylene/α-olefin copolymer: 100.0 parts by weight
silane-treated silica: 30.0 parts by weight
stearic acid: 2.0 parts by weight
zinc flower: 5.0 parts by weight
promoter DPTT[1]: 0.5 part by weight
promoter ZnBDC[2]: 1.5 parts by weight
promoter: MBTS[3]: 3.0 parts by weight
sulfur: 1.5 parts by weight
antioxidant AANP[4]: 1.0 part by weight
Note
1) dipentamethylene-thiuram tetrasulfide supplied by Ouchi Shinko
2) zinc di-n-butyldithiocarbamate supplied by Ouchi Shinko
3) dibenzothiazyl disulfide supplied by Ouchi Shinko
4) powdery condensate of aldol and 1-naphthylamine supplied by Ouchi Shinko

EXAMPLE 14

The procedures of Example 1 were repeated in the same manner except that the recipe was changed as indicated below.

Recipe ethylene/α-olefin copolymer rubber: 100.0 parts by weight
silane-treated silica: 15.0 parts by weight
stearic acid: 2.0 parts by weight
zinc flower: 5.0 parts by weight
organic peroxide[1]: 5.0 parts by weight
sulfur: 0.2 part by weight
antioxidant MB[2]: 2.0 parts by weight
antioxidant 200[3]: 1.0 part by weight

EXAMPLE 15

The procedures of Example 1 were repeated in the same manner except that the recipe was changed as indicated below.

Recipe ethylene/α-olefin copolymer rubber: 100.0 parts by weight
silane-treated silica: 50.0 parts by weight
stearic acid: 2.0 parts by weight
synthetic lubricating oil[1]: 20.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight
Note
1) Lucant ®HC-600 supplied Mitsui Petrochemical

EXAMPLE 16

The procedures of Example 1 were repeated in the same manner except that the following silane-treated silica was used.

Silane-treated silica silica: Nipsil VH$_3$ (supplied by Nippon Silica)
silane coupling agent: chloropropyltrimethoxysilane
treatment amount (carbon content): 2.5% by weight.

COMPARATIVE EXAMPLE 2

The procedures of Example 16 were repeated in the same manner except that the recipe was changed as indicated below.

Recipe ethylene/α-olefin copolymer rubber: 100.0 parts by weight
silane-treated silica: 5.0 parts by weight
stearic acid: 2.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight

COMPARATIVE EXAMPLE 3

The procedures of Example 16 were repeated in the same manner except that the recipe was changed as indicated below.

Recipe ethylene/α-olefin copolymer rubber: 100.0 parts by weight
silane-treated silica: 110.0 parts by weight
stearic acid: 2.0 parts by weight
synthetic lubricating oil[1]: 60.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight Note
1) Lucant ®HC-600 supplied by Mitsui Petrochemical The results obtained in the foregoing examples are shown in Table 1.

TABLE 1

| | Ex. 1 | Ex. 2 | Ex. 3 | Ex. 4 | Comp. Ex. 1 | Ex. 5 | Ex. 6 | Ex. 7 | Ex. 8 | Ex. 9 | Ex. 10 |
|---|---|---|---|---|---|---|---|---|---|---|---|
| Composition | | | | | | | | | | | |
| *ethylene/α-olefin copolymer rubber* | | | | | | | | | | | |
| I. $(\eta)$: 1.8, α-olefin: $C_3$, $C_2$ content: 68 mole %, IV: 5(ENB) | 100 | | | | 100 | 100 | 100 | 100 | 100 | | |
| II. $(\eta)$: 1.5, α-olefin: $C_3$, $C_2$ content: 80 mole % | | 100 | | | | | | | | | |
| III. $(\eta)$: 3.0, α-olefin: $C_3$, $C_2$ content: 80 mole %, IV: 3(VNB) | | | 100 | | | | | | | | |
| IV. $(\eta)$: 1.3, α-olefin: $C_4$, $C_2$ content: 90 mole % | | | | 100 | | | | | | | |
| V. $(\eta)$: 2.7, α-olefin: $C_3$, $C_2$ content: 70 mole %, IV: 10(ENB) | | | | | | | | | | | |
| MAH-II | | | | | | | | | | 100 | |
| ethyl acrylate-IV | | | | | | | | | | | 100 |
| *silica type filler* | | | | | | | | | | | |
| chloropropyltrimethoxysilane-treated dry method silica (C content: 2.0 wt. %) | 30 | 30 | 30 | 30 | | | 30 | | | 30 | |
| chloropropyltrimethoxysilane-treated dry method silica (C content: 0.5 wt. %) | | | | | | | | 30 | | | |
| chloropropyltrimethoxysilane-treated dry method silica (C content: 3.5 wt. %) | | | | | | | | | 30 | | |
| vinyltrimethoxysilane-treated dry method silica (C content: 2.5 wt. %) | | | | | | 30 | | | | | 30 |
| allyltrimethoxysilane-treated dry method silica (C content: 3.0 wt. %) | | | | | | | 30 | | | | |
| chloropropyltrimethoxysilane-treated wet method silica (C content: 2.0 wt. %) | | | | | | | | | | | |
| untreated dry method silica | | | | | 30 | | | | | | |
| Properties of Cured Rubber | | | | | | | | | | | |
| *normal state* | | | | | | | | | | | |
| tensile strength TB (kg/cm²) | 185 | 211 | 230 | 241 | 121 | 161 | 180 | 179 | 191 | 260 | 225 |
| elongation EB (%) | 590 | 660 | 610 | 650 | 490 | 510 | 600 | 570 | 610 | 640 | 540 |
| *heat aging resistance (180° C. × 96 hours)* | | | | | | | | | | | |
| tensile strength retention ratio AR (TB) (%) | 71 | 74 | 73 | 78 | <10 | 65 | 73 | 68 | 78 | 81 | 78 |
| elongation retention ratio AR (EB) (%) | 76 | 75 | 76 | 80 | <10 | 72 | 75 | 77 | 76 | 86 | 80 |

| | Ex. 11 | Ex. 12 | Ex. 13 | Ex. 14 | Ex. 15 | Ex. 16 | Comp. Ex. 2 | Comp. Ex. 3 |
|---|---|---|---|---|---|---|---|---|
| Composition | | | | | | | | |
| *ethylene/α-olefin copolymer rubber* | | | | | | | | |
| I. $(\eta)$: 1.8, α-olefin: $C_3$, $C_2$ content: 68 mole %, IV: 5(ENB) | | | | 100 | 100 | 100 | 100 | 100 |
| II. $(\eta)$: 1.5, α-olefin: $C_3$, $C_2$ content: 80 mole % | | | | | | | | |
| III. $(\eta)$: 3.0, α-olefin: $C_3$, $C_2$ content: 80 mole %, IV: 3(VNB) | | | | | | | | |
| IV. $(\eta)$: 1.3, α-olefin: $C_4$, $C_2$ content: 90 mole % | | | | | | | | |
| V. $(\eta)$: 2.7, α-olefin: $C_3$, $C_2$ content: 70 mole %, IV: 10(ENB) | | | 100 | | | | | |
| MAH-II | 100 | | | | | | | |
| ethyl acrylate-IV | | 100 | | | | | | |
| *silica type filler* | | | | | | | | |
| chloropropyltrimethoxysilane-treated dry method silica (C content: 2.0 wt. %) | | 30 | 30 | | 15 | 50 | 5 | |
| chloropropyltrimethoxysilane-treated dry method silica (C content: 0.5 wt. %) | | | | | | | | |
| chloropropyltrimethoxysilane-treated dry method silica (C content: 3.5 wt. %) | | | | | | | | |
| vinyltrimethoxysilane-treated dry method silica (C content: 2.5 wt. %) | | | | | | | | |
| allyltrimethoxysilane-treated dry method silica (C content: 3.0 wt. %) | 30 | | | | | | | |
| chloropropyltrimethoxysilane-treated wet method silica (C content: 2.0 wt. %) | | | | | | 30 | | 110 |
| untreated dry method silica | | | | | | | | |
| Properties of Cured Rubber | | | | | | | | |
| *normal state* | | | | | | | | |
| tensile strength TB (kg/cm²) | 231 | 230 | 171 | 171 | 200 | 176 | 68 | 51 |
| elongation EB (%) | 610 | 590 | 480 | 510 | 680 | 670 | 580 | 310 |
| *heat aging resistance (180° C. × 96 hours)* | | | | | | | | |
| tensile strength retention ratio AR (TB) (%) | 83 | 79 | 89 | 73 | 75 | 62 | — | — |

TABLE 1-continued

| elongation retention ratio AR (EB) (%) | 79 | 83 | 70 | 76 | 71 | 70 | — | — |

Note:
Ex.: Example
Comp. Ex.: Comparative Example

EXAMPLE 17

A rubber composition was prepared by using the following indispensable components (A) through (C) according to the following recipe.

Ethylene/α-olefin copolymer rubber (A)

ethylene content: 68 mole %
α-olefin: propylene
[η]: 1.8
iodine value: 5 (ethylidene-norbornene)

Silane-treated silica (B)

silica: dry method silica having specific surface area of 200 m$^2$/g
silane coupling agent: chloropropyltrimethoxysilane
treatment amount (carbon content): 2.0% by weight Polyorganosiloxane (C)

chemical formula: $(CH_3)_{1.6}(ClCH_2CH_2CH_2)_{0.2}SiO$
number average molecular weight: $5.0 \times 10^3$ Recipe ethylene/α-olefin copolymer rubber: 100.0 parts by weight
polyorganosiloxane: 3.0 parts by weight
silane-treated silica: 30.0 parts by weight
stearic acid: 2.0 parts by weight
zinc flower: 5.0 parts by weight
organic peroxide[1]: 5.0 parts by weight
sulfur: 0.2 part by weight
antioxidant MB[2]: 2.0 parts by weight
antioxidant 200[3]: 1 part by weight Note
1) Mitsui DCP 40C supplied by Mitsui Petrochemical
2) 2-mercaptobenzimidazole supplied by Ouchi Shinko
3) 2,6-di-tert-butyl-4-methylphenol supplied by Ouchi Shinko Kneading was carried out at 60° to 70° C. for 20 minutes by an 8-inch open roll. Then, the mixture was press-cured at 170° C. for 10 minutes to form a cured sheet having a thickness of 2 mm, and the sheet was used for the measurement.

The following properties were measured according to the method of JIS K-6301.

Normal State Physical Properties tensile strength (TB) and elongation (EB)
Heat aging resistance (heat aging conditions: 180° C.×96 hours)
tensile strength retention ratio AR(TB) and elongation retention ratio AR(EB)

The obtained results are shown in Table 2.

EXAMPLE 18

The procedures of Example 17 were repeated in the same manner except that the following ethylene/α-olefin copolymer rubber was used.
ethylene content: 80 mole %
α-olefin: propylene
[η]: 1.5

EXAMPLE 19

The procedures of Example 17 were repeated in the same manner except that the following ethylene/α-olefin copolymer rubber was used.
ethylene content: 80 mole %
α-olefin: propylene
[η]: 3.0
iodine value: 3 (vinylnorbornene)

EXAMPLE 20

The procedures of Example 17 were repeated in the same manner except that the following ethylene/α-olefin copolymer rubber was used.
ethylene content: 90 mole %
α-olefin: 1-butene
[η]: 1.3

EXAMPLE 21

The procedures of Example 17 were repeated in the same manner except that the following polyorganosilane was used.

Polyorganosilane chemical formula: $(CH_3)_{1.8}(CH_2=CH)_{0.2}SiO$
number average molecular weight: $5.1 \times 10^3$

EXAMPLE 22

The procedures of Example 17 were repeated in the same manner except that the following silane-treated silica was used.
silica: dry method silica having specific surface area of 200 m$^2$/g
silane coupling agent: vinyltrimethoxy-silane
treatment amount (carbon content): 2.5% by weight.

EXAMPLE 23

The procedures of Example 17 were repeated in the same manner except that the following silane-treated silica was used.
silica: dry method silica having specific surface area of 200 m$^2$/g
silane coupling agent: vinyltrimethoxysilane
treatment amount (carbon content): 3.0% by weight.

COMPARATIVE EXAMPLE 4

The procedures of Example 17 were repeated in the same manner except that the polyorganosilane was not used and the untreated silica was used.

COMPARATIVE EXAMPLE 5

The procedures of Example 17 were repeated in the same manner except that the following polyorganosiloxane was used and the untreated silica was used.

Polydimethylsiloxane number average molecular weight: $4.8 \times 10^3$

EXAMPLE 24

The procedures of Example 17 were repeated in the same manner except that the treatment amount of the silane-treated silica was changed to a carbon content of 0.5% by weight.

EXAMPLE 25

The procedures of Example 17 were repeated in the same manner except that the treatment amount of the silane-treated silica was changed to a carbon content of 3.5% by weight.

EXAMPLE 26

The procedures of Example 17 were repeated in the same manner except that the number average molecular weight of the polyorganosiloxane was changed to $6 \times 10^4$.

EXAMPLE 27

The procedures of Example 17 were repeated in the same manner except that the following polyorganosiloxane was used.

Polyorganosiloxane average composition: $(CH_3)_{1.9}(ClCH_2CH_2CH_2)_{0.1}SiO$
number average molecular weight: $5.5 \times 10^3$

EXAMPLE 28

The procedures of Example 17 were repeated in the same manner except that the following polyorganosiloxane was used.

Polyorganosiloxane average composition: $(CH_3)_{1.5}(ClCH_2CH_2CH_2)_{0.5}SiO$
number average molecular weight: $5.5 \times 10^3$

EXAMPLE 29

The procedures of Example 18 were repeated in the same manner except that a modified ethylene/α-olefin copolymer rubber obtained by modifying the ethylene/α-olefin copolymer rubber used in Example 18 with maleic anhydride was used.
maleic anhydride content: $5 \times 10^{-3}$ mole per 100 g of copolymer rubber.

EXAMPLE 30

The procedures of Example 29 were repeated in the same manner except that the following polyorganosiloxane was used.

Polyorganosiloxane average composition: $(CH_3)_{1.8}(CH_2=CH)_{0.2}SiO$
number average molecular weight: $4.8 \times 10^3$

EXAMPLE 31

The procedures of Example 29 were repeated in the same manner except that the following silane-treated silica was used.
silica: dry method silica having specific surface area of 200 m²/g
silane coupling agent: vinyltrimethoxysilane
treatment amount (carbon content): 2.5% by weight.

EXAMPLE 32

The procedures of Example 20 were repeated in the same manner except that a modified ethylene/α-olefin copolymer rubber obtained by modifying the ethylene/α-olefin copolymer rubber obtained by modifying the ethylene/α-olefin copolymer rubber used in Example 20 with ethyl acrylate was used.
ethyl acrylate content: $10^{-2}$ mole % per 100 g of copolymer rubber.

EXAMPLE 33

The procedures of Example 17 were repeated in the same manner except that the following ethylene/α-olefin copolymer rubber was used, the recipe was changed as indicated below and curing was conducted at 160° C. for 20 minutes.

Ethylene/α-olefin copolymer rubber ethylene content: 70 mole %
α-olefin: propylene
[η]: 2.7
iodine value: 10 (ethylidene-norbornene)

Recipe ethylene/α-olefin copolymer: 100.0 parts by weight
polyorganosiloxane: 3.0 parts by weight
silane-treated silica: 30.0 parts by weight
stearic acid: 2.0 parts by weight
zinc flower: 5.0 parts by weight
promoter DPTT[1]: 0.5 parts by weight
promoter ZnBDC[2]: 1.5 parts by weight
promoter MBTS[3]: 3.0 parts by weight
sulfur: 1.5 parts by weight
antioxidant AANP[4]: 1.0 part by weight
Note
1) dipentamethylene-thiuram tetrasulfide supplied by Ouchi Shinko
2) zinc di-n-butyldithiocarbamate supplied by Ouchi Shinko
3) dibenzothiazyl disulfide supplied by Ouchi Shinko
4) powdery condensate of aldol and 1-naphthylamine supplied by Ouchi Shinko

EXAMPLE 34

The procedures of Example 17 were repeated in the same manner except that the recipe was changed as indicated below.

Recipe ethylene/α-olefin copolymer rubber: 100.0 parts by weight
polyorganosiloxane: 3.0 parts by weight
silane-treated silica: 15.0 parts by weight
stearic acid: 2.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight

EXAMPLE 35

The procedures of Example 17 were repeated in the same manner except that the recipe was changed as indicated below.

Recipe ethylene/α-olefin copolymer rubber: 100.0 parts by weight
polyorganosiloxane: 3.0 parts by weight
silane-treated silica: 50.0 parts by weight
stearic acid: 2.0 parts by weight
synthetic lubricating oil[1]: 20.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight
Note
1) Lucant ® HC-600 supplied Mitsui Petrochemical

EXAMPLE 36

The procedures of Example 17 were repeated in the same manner except that the amount incorporated of the polyorganosiloxane was changed to 20 parts by weight.

EXAMPLE 37

The procedures of Example 17 were repeated in the same manner except that the following silane-treated silica was used.

Silane-Treated Silica silica: Nipsil VH3 (supplied by Nippon Silica)
silane coupling agent: chloropropyltrimethoxysilane
treatment amount (carbon content): 2.5% by weight.

COMPARATIVE EXAMPLE 6

The procedures of Example 17 were repeated in the same manner except that the recipe was changed as indicated below.

Recipe ethylene/α-olefin copolymer rubber: 100.0 parts by weight
polyorganosiloxane: 3.0 parts by weight
silane-treated silica: 5.0 parts by weight
stearic acid: 2.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight

COMPARATIVE EXAMPLE 7

The procedures of Example 37 were repeated in the same manner except that the recipe was changed as indicated below.

Recipe ethylene/α-olefin copolymer rubber: 100 parts by weight
polyorganosiloxane: 3.0 parts by weight
silane-treated silica: 110.0 parts by weight
stearic acid: 2.0 parts by weight
synthetic lubricating oil: 60.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight The results obtained in the foregoing examples are shown in Table 2.

TABLE 2

| | Ex. 17 | Ex. 18 | Ex. 19 | Ex. 20 | Ex. 21 | Ex. 22 | Ex. 23 | Comp. Ex. 4 | Comp. Ex. 5 |
|---|---|---|---|---|---|---|---|---|---|
| Composition | | | | | | | | | |
| ethylene/α-olefin copolymer rubber | | | | | | | | | |
| I. ($\eta$): 1.8, α-olefin: $C_3$, $C_2$ content: 68 mole %, IV: 5(ENB) | 100 | | | | 100 | 100 | 100 | 100 | 100 |
| II. ($\eta$): 1.5, α-olefin: $C_3$, $C_2$ content: 80 mole %, | | 100 | | | | | | | |
| III. ($\eta$): 3.0, α-olefin: $C_3$, $C_2$ content: 80 mole %, IV: 3(VNB) | | | 100 | | | | | | |
| IV. ($\eta$): 1.3, α-olefin: $C_4$, $C_2$ content: 90 mole %, | | | | 100 | | | | | |
| V. ($\eta$): 2.7, α-olefin: $C_3$, $C_2$ content: 70 mole %, IV: 10(ENB) | | | | | | | | | |
| MAH-II | | | | | | | | | |
| ethylacrylate-IV | | | | | | | | | |
| polyorganosiloxane | | | | | | | | | |
| $(CH_3)_{1.8}(ClCH_2CH_2CH_2)_{0.2}SiO$ Mn: $5.0 \times 10^3$ | 3 | 3 | 3 | 3 | | 3 | 3 | | |
| $(CH_3)_{1.9}(ClCH_2CH_2CH_2)_{0.1}SiO$ Mn: $5.5 \times 10^3$ | | | | | | | | | |
| $(CH_3)_{1.5}(ClCH_2CH_2CH_2)_{0.5}SiO$ Mn: $5.2 \times 10^3$ | | | | | | | | | |
| $(CH_3)_{1.8}(ClCH_2CH_2CH_2)_{0.2}SiO$ Mn: $6.0 \times 10^4$ | | | | | | | | | |
| $(CH_3)_{1.8}(CH_2=CH)_{0.2}SiO$ Mn: $5.1 \times 10^3$ | | | | | 3 | | | | |
| polydimethylsiloxane Mn: $4.8 \times 10^3$ | | | | | | | | | 3 |
| silica type filler | | | | | | | | | |
| chloropropyltrimethoxysilane-treated dry method silica (C cont.: 2.0 wt. %) | 30 | 30 | 30 | 30 | 30 | | | | |
| chloropropyltrimethoxysilane-treated dry method silica (C cont.: 0.5 wt. %) | | | | | | | | | |
| chloropropyltrimethoxysilane-treated dry method silica (C cont.: 3.5 wt. %) | | | | | | | | | |
| vinyltrimethoxysilane-treated dry method silica (C cont.: 2.5 wt. %) | | | | | | 30 | | | |
| allyltrimethoxysilane-treated dry method silica (C cont.: 3.0 wt. %) | | | | | | | 30 | | |
| chloropropyltrimethoxysilane-treated wet method silica (C cont.: 2.5 wt. %) | | | | | | | | | |
| untreated dry method silica | | | | | | | | 30 | 30 |
| Physical Properties of Cured Rubber | | | | | | | | | |
| normal state | | | | | | | | | |
| tensile strength TB (kg/cm²) | 177 | 193 | 225 | 230 | 165 | 163 | 170 | 121 | 98 |
| elongation EB (%) | 590 | 650 | 620 | 650 | 640 | 560 | 590 | 490 | 350 |
| heat aging resistance (180° C. × 96 hours) | | | | | | | | | |
| tensile strength retention ratio AR (TB) (%) | 92 | 93 | 90 | 93 | 89 | 87 | 91 | <10 | <10 |
| elongation retention ratio AR (TB) (%) | 86 | 89 | 93 | 93 | 86 | 89 | 92 | <10 | <10 |

| | Ex. 24 | Ex. 25 | Ex. 26 | Ex. 27 | Ex. 28 | Ex. 29 | Ex. 30 | Ex. 31 | Ex. 32 |
|---|---|---|---|---|---|---|---|---|---|
| Composition | | | | | | | | | |
| ethylene/α-olefin copolymer rubber | | | | | | | | | |
| I. ($\eta$): 1.8, α-olefin: $C_3$, $C_2$ content: 68 mole %, IV: | 100 | 100 | 100 | 100 | 100 | | | | |

TABLE 2-continued

| | | | | | | | | | |
|---|---|---|---|---|---|---|---|---|---|
| 5(ENB) | | | | | | | | | |
| II. (η): 1.5, α-olefin: C₃, C₂ content: 80 mole %, | | | | | | | | | |
| III. (η): 3.0, α-olefin: C₃, C₂ content: 80 mole %, IV: 3(VNB) | | | | | | | | | |
| IV. (η): 1.3, α-olefin: C₄, C₂ content: 90 mole %, | | | | | | | | | |
| V. (η): 2.7, α-olefin: C₃, C₂ content: 70 mole %, IV: 10(ENB) | | | | | | | | | |
| MAH-II | | | | | | 100 | 100 | 100 | |
| ethylacrylate-IV | | | | | | | | | 100 |
| polyorganosiloxane | | | | | | | | | |
| (CH₃)₁.₈(ClCH₂CH₂CH₂)₀.₂SiO Mn: 5.0 × 10³ | 3 | 3 | | | | 3 | | 3 | 3 |
| (CH₃)₁.₉(ClCH₂CH₂CH₂)₀.₁SiO Mn: 5.5 × 10³ | | | | 3 | | | | | |
| (CH₃)₁.₅(ClCH₂CH₂CH₂)₀.₅SiO Mn: 5.2 × 10³ | | | | | 3 | | | | |
| (CH₃)₁.₈(ClCH₂CH₂CH₂)₀.₂SiO Mn: 6.0 × 10⁴ | | | 3 | | | | | | |
| (CH₃)₁.₈(CH₂=CH)₀.₂SiO Mn: 5.1 × 10³ | | | | | | | 3 | | |
| polydimethylsiloxane Mn: 4.8 × 10³ | | | | | | | | | |
| silica type filler | | | | | | | | | |
| chloropropyltrimethoxysilane-treated dry method silica (C cont.: 2.0 wt. %) | | | 30 | 30 | 30 | 30 | | | 30 |
| chloropropyltrimethoxysilane-treated dry method silica (C cont.: 0.5 wt. %) | 30 | | 30 | | | | | | |
| chloropropyltrimethoxysilane-treated dry method silica (C cont.: 3.5 wt. %) | | 30 | | | | | | | |
| vinyltrimethoxysilane-treated dry method silica (C cont.: 2.5 wt. %) | | | | | | | | 30 | |
| allyltrimethoxysilane-treated dry method silica (C cont.: 3.0 wt. %) | | | | | | | | | |
| chloropropyltrimethoxysilane-treated wet method silica (C cont.: 2.5 wt. %) | | | | | | | | | |
| untreated dry method silica | | | | | | | | | |
| Physical Properties of Cured Rubber | | | | | | | | | |
| *normal state* | | | | | | | | | |
| tensile strength TB (kg/cm²) | 172 | 186 | 170 | 162 | 181 | 252 | 227 | 244 | 238 |
| elongation EB (%) | 570 | 600 | 590 | 610 | 560 | 640 | 740 | 590 | 550 |
| *heat aging resistance (180° C. × 96 hours)* | | | | | | | | | |
| tensile strength retention ratio AR (TB) (%) | 88 | 91 | 90 | 91 | 89 | 98 | 99 | 96 | 95 |
| elongation retention ratio AR (TB) (%) | 85 | 87 | 88 | 86 | 92 | 97 | 95 | 100 | 98 |

| | Ex. 33 | Ex. 34 | Ex. 35 | Ex. 36 | Ex. 37 | Comp. Ex. 6 | Comp. Ex. 7 |
|---|---|---|---|---|---|---|---|
| Composition | | | | | | | |
| ethylene/α-olefin copolymer rubber | | | | | | | |
| I. (η): 1.8, α-olefin: C₃, C₂ content: 68 mole %, IV: 5(ENB) | | 100 | 100 | 100 | 100 | 100 | 100 |
| II. (η): 1.5, α-olefin: C₃, C₂ content: 80 mole %, | | | | | | | |
| III. (η): 3.0, α-olefin: C₃, C₂ content: 80 mole %, IV: 3(VNB) | | | | | | | |
| IV. (η): 1.3, α-olefin: C₄, C₂ content: 90 mole %, | | | | | | | |
| V. (η): 2.7, α-olefin: C₃, C₂ content: 70 mole %, IV: 10(ENB) | −100 | | | | | | |
| MAH-II | | | | | | | |
| ethyl acrylate-IV | | | | | | | |
| polyorganosiloxane | | | | | | | |
| (CH₃)₁.₈(ClCH₂CH₂CH₂)₀.₂SiO Mn: 5.0 × 10³ | 3 | 3 | 3 | 20 | 3 | 3 | 3 |
| (CH₃)₁.₉(ClCH₂CH₂CH₂)₀.₁SiO Mn: 5.5 × 10³ | | | | | | | |
| (CH₃)₁.₅(ClCH₂CH₂CH₂)₀.₅SiO Mn: 5.2 × 10³ | | | | | | | |
| (CH₃)₁.₈(ClCH₂CH₂CH₂)₀.₂SiO Mn: 6.0 × 10⁴ | | | | | | | |
| (CH₃)₁.₈(CH₂=CH)₀.₂SiO Mn: 5.1 × 10³ | | | | | | | |
| polydimethylsiloxane Mn: 4.8 × 10³ | | | | | | | |
| silica type filler | | | | | | | |
| chloropropyltrimethoxysilane-treated dry method silica (C cont.: 2.0 wt. %) | 30 | 15 | 50 | 30 | | 5 | |
| chloropropyltrimethoxysilane-treated dry method silica (C cont.: 0.5 wt. %) | | | | | | | |
| chloropropyltrimethoxysilane-treated dry method silica (C cont.: 3.5 wt. %) | | | | | | | |
| vinyltrimethoxysilane-treated dry method silica (C cont.: 2.5 wt. %) | | | | | | | |
| allyltrimethoxysilane-treated dry method silica (C cont.: 3.0 wt. %) | | | | | | | |
| chloropropyltrimethoxysilane-treated wet method silica (C cont.: 2.5 wt. %) | | | | | 30 | | 110 |
| untreated dry method silica | | | | | | | |
| Physical Properties of Cured Rubber | | | | | | | |
| *normal state* | | | | | | | |
| tensile strength TB (kg/cm²) | 161 | 163 | 184 | 147 | 171 | 51 | 36 |
| elongation EB (%) | 470 | 640 | 670 | 760 | 560 | 420 | 250 |
| *heat aging resistance (180° C. × 96 hours)* | | | | | | | |
| tensile strength retention ratio AR (TB) (%) | 92 | 88 | 90 | 97 | 89 | — | — |

TABLE 2-continued

| elongation retention ratio AR (TB) (%) | 81 | 86 | 82 | 96 | 82 | — | — |

Note;
Ex.: Example,
cont.: content,
Comp. Ex.: Comparative Example

EXAMPLE 38

A rubber composition was prepared by using the following modified ethylene/α-olefin copolymer rubber (A), silica type filler (B) and polyorganosiloxane (C) according to the following recipe.

Modified ethylene/α-olefin copolymer rubber

α-olefin: propylene
ethylene/propylene molar ratio: 80/20
Mooney viscosity $ML_{1+4}$ (100° C.): 20
maleic anhydride content: 0.5% by weight

Silica Type Filler (B)

dry method silica having specific surface area of $200^2/g$

Polyorganosiloxane (C)

chemical formula: $(CH_2)_{1.8}(CH_2=CH)_{0.2}SiO$
number average molecular weight Mn: $5.1 \times 10^3$

Recipe ethylene/α-olefin copolymer rubber: 100.0 parts by weight
polyorganosiloxane: 3.0 parts by weight
silica type filler: 30.0 parts by weight
stearic acid: 2.0 parts by weight
zinc flower: 5.0 parts by weight
organic peroxide[1]: 5.0 parts by weight
sulfur: 0.2 part by weight
antioxidant MB[2]: 2.0 parts by weight
antioxidant 200[3]: 1.0 part by weight Note
1) Mitsui DCP 40C supplied by Mitsui Petrochemical
2) 2-mercaptobenzimidazole supplied by Ouchi Shinko
3) 2,6-di-tert-butyl-4-methylphenol supplied by Ouchi Shinko Kneading was carried out at 60° to 70° C. for 20 minutes by an 8-inch open roll. Then, the mixture was press-cured at 170° C. for 10 minutes to form a cured sheet having a thickness of 2 mm, and the sheet was used for the measurement.

The following properties were measured according to the method of JIS K-6301.

Normal State Physical Properties tensile strength (TB) and elongation (EB)
Heat aging resistance (heat aging conditions: 180° C. × 96 hours)
tensile strength retention ratio AR(TB) and elongation retention ratio AR(EB)

The obtained results are shown in Table 3.

EXAMPLE 39

The procedures of Example 38 were repeated in the same manner except that the following modified ethylene/α-olefin copolymer rubber was used.
α-olefin: propylene
ethylene/propylene molar ratio: 70/30
iodine value: 2 (vinylnorbornene)
Mooney viscosity $ML_{1+4}$ (100° C.): 60
maleic anhydride: 0.5% by weight

EXAMPLE 40

The procedures of Example 38 were repeated in the same manner except that the following modified ethylene/α-olefin copolymer rubber was used.
α-olefin: 1-butene
ethylene/1-butene molar ratio: 90/10
Mooney viscosity $ML_{1+4}$ (100° C.): 15
maleic anhydride: 1.0% by weight

Recipe ethylene/α-olefin copolymer rubber: 100.0 parts by weight
polyorganosiloxane: 20.0 parts by weight
silica type filler: 30.0 parts by weight
stearic acid: 2.0 parts by weight
zinc flower: 5.0 parts by weight
organic peroxide[1]: 5.0 parts by weight
sulfur: 0.2 part by weight
antioxidant MB[2]: 2.0 parts by weight
antioxidant 200[3]: 1.0 part by weight.

EXAMPLE 42

The procedures of Example 38 were repeated in the same manner except that the following polyorganosilane was used.

Polyorganosilane chemical formula: $(CH_3)_{1.9}(CH_2=CH)_{0.1}SiO$
number average molecular weight: $4.5 \times 10^3$

EXAMPLE 43

The procedures of Example 38 were repeated in the same manner except that the following polyorganosiloxane was used.

Polyorganosiloxane average composition: $(CH_3)_{1.5}(CH_2=CH)_{0.5}SiO$
number average molecular weight: $6.1 \times 10^3$

EXAMPLE 44

The procedures of Example 38 were repeated in the same manner except that the number average molecular weight of the polyorganosiloxane was changed to $8.0 \times 10^4$.

EXAMPLE 45

The procedures of Example 38 were repeated in the same manner except that the following silica type filler was used.

Silica Type Filler silica: Nipsil VH3 (supplied by Nippon Silica)

EXAMPLE 46

The procedures of Example 38 were repeated in the same manner except that the following silica type filler was used and the recipe was changed as indicated below.

Silica Type Filler calcined clay (Satenton No. 1 supplied by Engelhard Minerals & Chem.)

Recipe modified ethylene/α-olefin copolymer rubber: 100.0 parts by weight
polyorganosiloxane: 3.0 parts by weight
calcined clay: 60.0 parts by weight
stearic acid: 2.0 parts by weight
zinc flower: 5.0 parts by weight
organic peroxide[1]: 5.0 parts by weight
sulfur: 0.2 part by weight
antioxidant MB[2]: 2.0 parts by weight
antioxidant 200[3]: 1.0 part by weight

COMPARATIVE EXAMPLE 8

The procedures of Example 38 were repeated in the same manner except that the polyorganosiloxane was not used.

COMPARATIVE EXAMPLE 9

The procedures of Example 38 were repeated in the same manner except that the following polyorganosiloxane was used.

Polydimethylsiloxane number average molecular weight: $4.8 \times 10^3$

EXAMPLE 47

The procedures of Example 38 were repeated in the same manner except that the following modified ethylene/α-olefin copolymer rubber was used.
α-olefin: 1-butene
ethylene/1-butene molar ratio: 90/10
Mooney viscosity $ML_{1+4}$ (100° C.): 30
ethyl acrylate content: 2.0% by weight

COMPARATIVE EXAMPLE 10

The procedures of Example 46 were repeated in the same manner except that the recipe was changed as indicated below.

Recipe modified ethylene/α-olefin copolymer rubber: 100.0 parts by weight
polyorganosiloxane: 3.0 parts by weight
calcined clay: 5.0 parts by weight
stearic acid: 2.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight

COMPARATIVE EXAMPLE 11

The procedures of Example 46 were repeated in the same manner except that the recipe was changed as indicated below.

Recipe modified ethylene/α-olefin copolymer rubber: 100.0 parts by weight
polyorganosiloxane: 3.0 parts by weight
calcined clay: 110.0 parts by weight
stearic acid: 2.0 parts by weight
synthetic lubricating oil[1]: 60.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight Note
1) Lucant®HC-600 supplied by Mitsui Petrochemical

COMPARATIVE EXAMPLE 12

The procedures of Example 46 were repeated in the same manner except that the unmodified ethylene/α-olefin copolymer rubber was used instead of the modified ethylene/α-olefin copolymer rubber.

The results obtained in the foregoing examples are shown in Table 3.

TABLE 3

| | Ex. 38 | Ex. 39 | Ex. 40 | Ex. 41 | Ex. 42 | Ex. 43 | Ex. 44 | Ex. 45 |
|---|---|---|---|---|---|---|---|---|
| Composition | | | | | | | | |
| modified/α-olefin copolymer rubber | | | | | | | | |
| I. $C_2/C_3 = 80/20$, (molar ratio), $ML_{1+4}:20$, MAH content: 0.5 wt % | 100 | | | 100 | 100 | 100 | 100 | 100 |
| II. $C_2/C_3 = 70/30$, (molar ratio), IV: 2(VNB), $ML_{1+4}:20$, MAH content: 0.5 wt % | | 100 | | | | | | |
| III. $C_2/C_4 = 90/10$, (molar ratio), $ML_{1+4}:15$, MAH content: 0.5 wt % | | | 100 | | | | | |
| IV. $C_2/C_4 = 90/10$, (molar ratio), $ML_{1+4}:30$, ethyl acrylate content 2.0 wt % | | | | | | | | |
| polyorganosiloxane | | | | | | | | |
| $(CH_3)_{1.8}(CH_2=CH)_{0.2}SiO$ Mn: $5.1 \times 10^3$ | 3 | 3 | 3 | 20 | | | | 3 |
| $(CH_3)_{1.9}(CH_2=CH)_{0.1}SiO$ Mn: $4.5 \times 10^3$ | | | | | 3 | | | |
| $(CH_3)_{1.5}(CH_2=CH)_{0.5}SiO$ Mn: $6.1 \times 10^3$ | | | | | | 3 | | |
| $(CH_3)_{1.8}(CH_2=CH)_{0.2}SiO$ Mn: $8.0 \times 10^4$ | | | | | | | 3 | |
| polydimethylsiloxane Mn: $4.8 \times 10^3$ | | | | | | | | |
| silica type filler | | | | | | | | |
| dry method silica | 30 | 30 | 30 | 30 | 30 | 30 | 30 | |
| wet method silica | | | | | | | | 30 |
| calcined clay | | | | | | | | |
| Physical Properties of Cured Rubber | | | | | | | | |
| normal state | | | | | | | | |
| tensile strength TB (kg/cm²) | 206 | 215 | 214 | 171 | 196 | 221 | 210 | 196 |
| elongation EB (%) | 710 | 730 | 730 | 810 | 760 | 670 | 690 | 680 |
| heat aging resistance (180° C. × 96 hours) | | | | | | | | |
| tensile strength retention ratio AR (TB) (%) | 72 | 76 | 72 | 94 | 70 | 75 | 74 | 68 |

TABLE 3-continued

| | | | | | | | |
|---|---|---|---|---|---|---|---|
| elongation retention ratio AR (EB) (%) | 64 | 70 | 71 | 75 | 66 | 66 | 65 | 60 |

| | Ex. 46 | Comp. Ex. 8 | Comp. Ex. 9 | Ex. 47 | Comp. Ex. 10 | Comp. Ex. 11 | Comp. Ex. 12 |
|---|---|---|---|---|---|---|---|
| Composition | | | | | | | |
| *modified/α-olefin copolymer rubber* | | | | | | | |
| I. $C_2/C_3$ = 80/20, (molar ratio), $ML_{1+4}$:20, MAH content: 0.5 wt % | 100 | 100 | 100 | | 100 | 100 | |
| II. $C_2/C_3$ = 70/30, (molar ratio), IV: 2(VNB), $ML_{1+4}$:20, MAH content: 0.5 wt % | | | | | | | |
| III. $C_2/C_4$ = 90/10, (molar ratio), $ML_{1+4}$:15, MAH content: 0.5 wt % | | | | | | | |
| IV. $C_2/C_4$ = 90/10, (molar ratio), $ML_{1+4}$:30, ethyl acrylate content 2.0 wt % | | | | 100 | | | |
| ethylene/-olefin copolymer rubber, $C_2/C_3$ = 8/20 (molar ratio), $ML_{1+4}$:19 | | | | | | | 100 |
| *polyorganosiloxane* | | | | | | | |
| $(CH_3)_{1.8}(CH_2=CH)_{0.2}SiO$ Mn: $5.1 \times 10^3$ | 3 | | | 3 | 3 | 3 | 3 |
| $(CH_3)_{1.9}(CH_2=CH)_{0.1}SiO$ Mn: $4.5 \times 10^3$ | | | | | | | |
| $(CH_3)_{1.5}(CH_2=CH)_{0.5}SiO$ Mn: $6.1 \times 10^3$ | | | | | | | |
| $(CH_3)_{1.8}(CH_2=CH)_{0.2}SiO$ Mn: $8.0 \times 10^4$ | | | | | | | |
| polydimethylsiloxane Mn: $4.8 \times 10^3$ | | | 30 | | | | |
| *silica type filler* | | | | | | | |
| dry method silica | | 30 | 30 | 30 | | | |
| wet method silica | | | | | | | |
| calcined clay | 60 | | | | 5 | 110 | 60 |
| Properties of Cured Rubber | | | | | | | |
| *normal state* | | | | | | | |
| tensile strength TB (kg/cm²) | 121 | 151 | 103 | 200 | 31 | 34 | 68 |
| elongation EB (%) | 710 | 510 | 370 | 670 | 340 | 160 | 580 |
| *heat aging resistance (180° C. × 96 hours)* | | | | | | | |
| tensile strength retention ratio AR (TB) (%) | 61 | <10 | <10 | 76 | — | — | — |
| elongation retention ratio AR (EB) (%) | 60 | <10 | <10 | 68 | — | — | — |

Note;
Ex.: Example
Comp. Ex.: Comparative Example

EXAMPLE 47

A rubber composition was prepared by using the following ethylene/α-olefin copolymer rubber (A), silica type filler (B) and polyorganosiloxane (C) according to the following recipe.

Ethylene/α-olefin copolymer rubber (A)

ethylene content: 68 mole %
α-olefin: propylene
$[\eta]$: 1.8
iodine value: 5 (ethylidene-norbornene)

Silica Type Filler (B)

silica: dry method silica having specific surface area of 200 m²/g

Polyorganosiloxane (C)

chemical formula: $(CH_2)_{1.8}(CH_2=CH)_{0.2}SiO$
number average molecular weight Mn: $5.0 \times 10^3$ Recipe ethylene/α-olefin copolymer rubber: 100.0 parts by weight
polyorganosiloxane: 3.0 parts by weight
silica type filler: 30.0 parts by weight
stearic acid: 2.0 parts by weight
zinc flower: 5.0 parts by weight
organic peroxide[1]: 5.0 parts by weight
sulfur: 0.2 part by weight
antioxidant MB[2]: 2.0 parts by weight
antioxidant 200[3]: 1 part by weight Note
1) Mitsui DCP 40C supplied by Mitsui Petrochemical
2) 2-mercaptobenzimidazole supplied by Ouchi Shinko
3) 2,6-di-tert-butyl-4-methylphenol supplied by Ouchi Shinko Kneading was carried out at 60° to 70° C. for 20 minutes by an 8-inch open roll. Then, the mixture was press-cured at 170° C. for 10 minutes to form a cured sheet having a thickness of 2 mm, and the sheet was used for the measurement.

The following properties were measured according to the method of JIS K-6301.

Normal State Physical Properties tensile strength (TB) and elongation (EB)
Heat aging resistance (heat aging conditions: 180° C.×96 hours)
tensile strength retention ratio AR(TB) and elongation retention ratio AR(EB)

The obtained results are shown in Table 4.

EXAMPLE 48

The procedures of Example 47 were repeated in the same manner except that the following ethylene/α-olefin copolymer rubber.
ethylene content: 80 mole %
α-olefin: propylene
$[\eta]$: 1.5

EXAMPLE 49

The procedures of Example 47 were repeated in the same manner except that the following ethylene/α-olefin copolymer rubber was used.
ethylene content: 80 mole %
α-olefin: propylene
$[\eta]$: 3.0
iodine value: 3 (vinylnorbornene)

EXAMPLE 50

The procedures of Example 47 were repeated in the same manner except that the following ethylene/α-olefin copolymer rubber was used.
ethylene content: 90 mole %
α-olefin: 1-butene
[η]: 1.3

COMPARATIVE EXAMPLE 13

The procedures of Example 47 were repeated in the same manner except that the polyorganosiloxane was not used.

COMPARATIVE EXAMPLE 14

The procedures of Example 47 repeated in the same manner except that the following polyorganosiloxane was used.

Polydimethylsiloxane
number average molecular weight: $4.8 \times 10^3$

EXAMPLE 51

The procedures of Example 47 were repeated in the same manner except that the following polyorganosiloxane was used.

Polyorganosiloxane
average composition: $(CH_3)_{1.9}(ClCH_2CH_2CH_2)_{0.1}SiO$
number average molecular weight: $5.5 \times 10^3$

EXAMPLE 52

The procedures of Example 47 were repeated in the same manner except that the following polyorganosiloxane was used.

Polyorganosiloxane
average composition: $(CH_3)_{1.5}(ClCH_2CH_2CH_2)_{0.5}SiO$
number average molecular weight: $5.2 \times 10^3$

EXAMPLE 53

The procedures of Example 47 were repeated in the same manner except that the number average molecular weight of the polyorganosiloxane was changed to $6.0 \times 10^4$.

EXAMPLE 54

The procedures of Example 48 were repeated in the same manner except that a modified ethylene/α-olefin copolymer rubber obtained by modifying the ethylene/α-olefin copolymer rubber used in Example 48 with maleic anhydride was used.
maleic anhydride content: $5 \times 10^{-3}$ mole per 100 g of copolymer rubber

EXAMPLE 55

The procedures of Example 54 were repeated in the same manner except that the following silica type filler was used.

Silica Type Filler wet method silica: Nipsil VH3 (supplied Nippon Silica)

EXAMPLE 56

The procedures of Example 50 were repeated in the same manner except that a modified ethylene/α-olefin copolymer rubber obtained by modifying the ethylene/α-olefin copolymer rubber used in Example 50 with ethyl acrylate was used.
ethyl acrylate content: $10^{-2}$ mole per 100 g of copolymer rubber

EXAMPLE 57

The procedures of Example 47 were repeated in the same manner except that the following ethylene/α-olefin copolymer rubber was used, the recipe was changed as indicated below and curing was conducted at 160° C. for 20 minutes.

Ethylene/α-olefin copolymer rubber
ethylene content: 70 mole %
α-olefin: propylene
[η]: 2.7
iodine value: 10 (ethylidene-norbornene)

Recipe ethylene/α-olefin copolymer: 100.0 parts by weight
polyorganosiloxane: 3.0 parts by weight
silic type filler: 30.0 parts by weight
stearic acid: 2.0 parts by weight
zinc flower: 5.0 parts by weight
promoter DPTT[1]: 0.5 part by weight
promoter ZnBDC[2]: 1.5 parts by weight
promoter: MBTS[3]: 3.0 parts by weight
sulfur: 1.5 parts by weight
antioxidant AANP[4]: 1.0 part by weight
Note
1) dipentamethylene-thiuram tetrasulfide supplied by Ouchi Shinko
2) zinc di-n-butyldithiocarbamate supplied by Ouchi Shinko
3) dibenzothiazyl disulfide supplied by Ouchi Shinko
4) powdery condensate of aldol and 1-naphthylamine supplied by Ouchi Shinko

EXAMPLE 58

The procedures of Example 47 were repeated in the same manner except that the recipe was changed as indicated below.

Recipe ethylene/α-olefin copolymer rubber: 100.0 parts by weight
polyorganosiloxane: 20.0 parts by weight
silica type filler: 30.0 parts by weight
stearic acid: 2.0 parts by weight
zinc flower: 5.0 parts by weight
organic peroxide[1]: 5.0 parts by weight
sulfur: 0.2 part by weight
antioxidant MB[2]: 2.0 parts by weight
antioxidant 200[3]: 1.0 part by weight

EXAMPLE 59

The procedures of Example 54 were repeated in the same manner except that the recipe was changed as indicated below.

Recipe modified ethylene/α-olefin copolymer rubber: 100.0 parts by weight
polyorganosiloxane: 3.0 parts by weight
silica type filler: 15.0 parts by weight
stearic acid: 2.0 parts by weight
zinc flower: 5.0 parts by weight
organic peroxide[1]: 5.0 parts by weight
sulfur: 0.2 part by weight
antioxidant MB[2]: 2.0 parts by weight
antioxidant 200[3]: 1.0 part by weight

EXAMPLE 60

The procedures of Example 54 were repeated in the same manner except that the recipe was changed as indicated below.

Recipe modified ethylene/α-olefin copolymer rubber: 100.0 parts by weight
polyorganosiloxane: 3.0 parts by weight
silica type filler: 50.0 parts by weight
stearic acid: 2.0 parts by weight
synthetic lubricating oil[1]: 20.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight
Note
1) Lucant ®HC-600 supplied Mitsui Petrochemical

COMPARATIVE EXAMPLE 15

The procedures of Example 55 were repeated in the same manner except that the recipe was changed as indicated below.

modified ethylene/α-olefin copolymer rubber: 100.0 parts by weight
polyorganosiloxane: 3.0 parts by weight
silica type filler: 5.0 parts by weight
stearic acid: 2.0 parts by weight
zinc flower: 5.0 parts by weight
organic peroxide: 5.0 parts by weight
sulfur: 0.2 part by weight
antioxidant MB: 2.0 parts by weight
antioxidant 200: 1.0 part by weight

COMPARATIVE EXAMPLE 16

The procedures of Example 55 were repeated in the same manner except that the recipe was changed as indicated below.

Recipe ethylene/α-olefin copolymer rubber: 100.0 parts by weight
polyorganosiloxane: 3.0 parts by weight
silica type filler: 110.0 parts by weight
stearic acid: 2.0 parts by weight
synthetic lubricating oil[1]: 60.0 parts by weight
zinc flower: 5.0 parts by weight
organic peroxide: 5.0 parts by weight
sulfur: 0.2 part by weight
antioxidant MB: 3.0 parts by weight
antioxidant 200: 1.0 part by weight
Note
1) Lucant ®HC-600 supplied by Mitsui Petrochemical The results obtained in the foregoing examples are shown in Table 4.

TABLE 4

| | Ex. 47 | Ex. 48 | Ex. 49 | Ex. 50 | Comp. Ex. 13 | Comp. Ex. 14 | Ex. 51 | Ex. 52 | Ex. 53 |
|---|---|---|---|---|---|---|---|---|---|
| Composition | | | | | | | | | |
| ethylene/α-olefin copolymer rubber | | | | | | | | | |
| I. ($\eta$): 1.8, α-olefin: $C_3$, $C_2$ content: 68 mole %, IV: 5 (ENB) | 100 | | | | 100 | 100 | 100 | 100 | 100 |
| II. ($\eta$): 1.5, α-olefin: $C_3$, $C_2$ content: 80 mole %, | | 100 | | | | | | | |
| III. ($\eta$): 3.0, α-olefin: $C_3$, $C_2$ content: 80 mole %, IV: 3 (VNB) | | | 100 | | | | | | |
| IV. ($\eta$): 1.3, α-olefin: $C_4$, $C_2$ content: 90 mole %, | | | | 100 | | | | | |
| V. ($\eta$): 2.7, α-olefin: $C_3$, $C_2$ content: 70 mole %, IV: 10 (ENB) | | | | | | | | | |
| MAH-II | | | | | | | | | |
| ethyl acrylate-IV | | | | | | | | | |
| polyorganosiloxane | | | | | | | | | |
| $(CH_3)_{1.8}(ClCH_2CH_2CH_2)_{0.2}SiO$ Mn: $5.0 \times 10^3$ | 3 | 3 | 3 | 3 | | | | | |
| $(CH_3)_{1.9}(ClCH_2CH_2CH_2)_{0.1}SiO$ Mn: $5.5 \times 10^3$ | | | | | | | 3 | | |
| $(CH_3)_{1.5}(ClCH_2CH_2CH_2)_{0.5}SiO$ Mn: $5.2 \times 10^3$ | | | | | | | | 3 | |
| $(CH_3)_{1.8}(ClCH_2CH_2CH_2)_{0.2}SiO$ Mn: $6.0 \times 10^4$ | | | | | | | | | 3 |
| polydimethylsiloxane Mn: $4.8 \times 10^3$ | | | | | | 3 | | | |
| silica type filler | | | | | | | | | |
| dry method silica | 30 | 30 | 30 | 30 | 30 | 30 | 30 | 30 | 30 |
| wet method silica | | | | | | | | | |
| Physical Properties of Cured Rubber | | | | | | | | | |
| normal state | | | | | | | | | |
| tensile strength TB (kg/cm$^2$) | 167 | 187 | 210 | 218 | 121 | 98 | 160 | 171 | 161 |
| elongation EB (%) | 580 | 630 | 610 | 630 | 490 | 350 | 580 | 550 | 560 |
| heat aging resistance (180° C. × 96 hours) | | | | | | | | | |
| tensile strength retention ratio AR (TB) (%) | 76 | 75 | 75 | 81 | <10 | <10 | 72 | 81 | 77 |
| elongation retention ratio AR (EB) (%) | 71 | 73 | 74 | 70 | <10 | <10 | 65 | 72 | 73 |

| | Ex. 54 | Ex. 55 | Ex. 56 | Ex. 57 | Ex. 58 | Ex. 59 | Ex. 60 | Comp. Ex. 15 | Comp. Ex. 16 |
|---|---|---|---|---|---|---|---|---|---|
| Composition | | | | | | | | | |
| ethylene/α-olefin copolymer rubber | | | | | | | | | |
| I. ($\eta$): 1.8, α-olefin: $C_3$, $C_2$ content: 68 mole %, IV: 5 (ENB) | | | | | 100 | | | | |
| II. ($\eta$): 1.5, α-olefin: $C_3$, $C_2$ content: 80 mole %, | | | | | | | | | |
| III. ($\eta$): 3.0, α-olefin: $C_3$, $C_2$ content: 80 mole %, IV: 3 (VNB) | | | | | | | | | |
| IV. ($\eta$): 1.3, α-olefin: $C_4$, $C_2$ content: 90 mole %, | | | | | | | | | |
| V. ($\eta$): 2.7, α-olefin: $C_3$, $C_2$ content: 70 mole %, IV: 10 (ENB) | 100 | | | | | | | | |
| MAH-II | 100 | 100 | | | 100 | 100 | 100 | 100 | |
| ethyl acrylate-IV | | | 100 | | | | | | |

TABLE 4-continued

| polyorganosiloxane | | | | | | | | | |
|---|---|---|---|---|---|---|---|---|---|
| $(CH_3)_{1.8}(ClCH_2CH_2CH_2)_{0.2}SiO$ Mn: $5.0 \times 10^3$ | 3 | 3 | 3 | 3 | 20 | 3 | 3 | 3 | 3 |
| $(CH_3)_{1.9}(ClCH_2CH_2CH_2)_{0.1}SiO$ Mn: $5.5 \times 10^3$ | | | | | | | | | |
| $(CH_3)_{1.5}(ClCH_2CH_2CH_2)_{0.5}SiO$ Mn: $5.2 \times 10^3$ | | | | | | | | | |
| $(CH_3)_{1.8}(ClCH_2CH_2CH_2)_{0.2}SiO$ Mn: $6.0 \times 10^4$ | | | | | | | | | |
| polydimethylsiloxane Mn: $4.8 \times 10^3$ | | | | | | | | | |
| silica type filler | | | | | | | | | |
| dry method silica | 30 | | 30 | 30 | 30 | 15 | 50 | | |
| wet method silica | | 30 | | | | | | 5 | 110 |
| Physical Properties of Cured Rubber | | | | | | | | | |
| normal state | | | | | | | | | |
| tensile strength TB (kg/cm²) | 241 | 212 | 210 | 157 | 171 | 221 | 240 | 72 | 57 |
| elongation EB (%) | 640 | 670 | 570 | 480 | 850 | 520 | 660 | 550 | 230 |
| heat aging resistance (180° C. × 96 hours) | | | | | | | | | |
| tensile strength retention ratio AR (TB) (%) | 80 | 76 | 82 | 87 | 100 | 81 | 78 | — | — |
| elongation retention ratio AR (EB) (%) | 84 | 72 | 76 | 71 | 92 | 79 | 71 | — | — |

Note;
Ex.: Example
Comp. Ex.: Comparative Example

We claim:

1. A heat-resistant rubber composition which comprises, as indispensable components, (A) 100 parts by weight of an ethylene/α-olefin copolymer rubber, said α-olefin having 3 to 10 carbon atoms, (B) 10 to 100 parts by weight of a siliciferous filler which has been treated with a silane compound represented by the following formula:

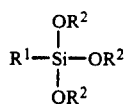

wherein $R^1$ stands for an alkenyl group, a chloroalkenyl group or a chloroalkyl group, and $R^2$ stands for a lower alkyl group, and (C) 0.5 to 30 parts by weight of a polyorganosiloxane having a number average molecular weight (Mn) of $10^2$ to $10^6$ and an average composition represented by the following formula:

$$(R^3)_a(R^4)_bSiO_{(4-a-b)/2}$$

wherein $R^3$ stands for a monovalent saturated or unsaturated hydrocarbon group, $R^4$ stands for a chloroalkyl group or an alkenyl group, a is a number of from 1 to 2.5 and b is a number of from 0.01 to 1.2, with the proviso that the sum of a and b is in the range of from 1.8 to 3.

2. A modified rubber composition comprising, as indispensable components, (A) 100 parts by weight of a modified ethylene/α-olefin copolymer formed by graft-copolymerization with at least one monomer selected from the group consisting of unsaturated carboxylic acids and anhydrides and esters thereof, said α-olefin having 3 to 10 carbon atoms, (B) 10 to 100 parts by weight of a siliciferous filler, and (C) 0.5 to 30 parts by weight of a polyorganosiloxane having a number average molecular weight (Mn) of $10^2$ to $10^6$ and an average composition represented by the following formula:

$$(R^3)_a(R^4)_bSiO_{(4-a-b)/2}$$

wherein $R^3$ stands for a monovalent saturated or unsaturated hydrocarbon group, $R^4$ stands for a chloroalkyl group or an alkenyl group, a is a number of from 1 to 2.5 and b is a number of from 0.01 to 1.2, with the proviso that the sum of a and b is in the range of from 1.8 to 3.

3. A modified polysiloxane-containing, heat-resistant rubber composition comprising, as indispensable components, (A) 100 parts by weight of an ethylene/α-olefin copolymer rubber, said α-olefin having 3 to 10 carbon atoms, (B) 10 to 100 parts by weight of a siliciferous filler and (C) 0.5 to 30 parts by weight of a polyorganosiloxane having a number average molecular weight (Mn) of $10^2$ to $10^6$ and an average composition represented by the following formula:

$$(R^3)_a(R^4)_bSiO_{(4-a-b)/2}$$

wherein $R^3$ stands for a monovalent saturated or unsaturated hydrocarbon group, $R^4$ stands for a chloroalkyl group or an alkenyl group, a is a number of from 1 to 2.5 and b is a number of from 0.01 to 1.2, with the proviso that the sum of a and b is in the range of from 1.8 to 3.

4. A curable rubber composition comprising (A) 100 parts by weight of an ethylene/α-olefin copolymer graft-copolymerized with at least one monomer selected from the group consisting of unsaturated carboxylic acids and anhydrides and esters thereof, said α-olefin having 3 to 10 carbon atoms, (B) (i) 10 to 100 parts by weight of a siliciferous filler which has been treated with a silane compound represented by the following formula:

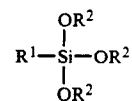

wherein $R^1$ stands for an alkenyl group, a chloroalkenyl group or a chloroalkyl group, and $R^2$ stands for a lower alkyl group, or (ii) a combination of 10 to 100 parts by weight of said silica-treated siliciferous filler or an untreated siliciferous filler and 0.5 to 30 parts by weight of a polyorganosiloxane having a number average molecular weight (Mn) of $10^2$ to $10^6$, and an average composition represented by the following formula:

$$(R^3)_a(R^4)_bSiO_{(4-a-b)/2}$$

wherein $R^3$ stands for a monovalent saturated or unsaturated hydrocarbon group, $R^4$ stands for a chloroalkyl group or an alkenyl group, a is a number of from 1 to 2.5 and b is a number of from 0.01 to 1.2, with the proviso that the sum of a and b is in the range of from 1.8 to 3; (C) 0.1 to 20 parts by weight of a curing agent comprising a sulfur compound, and (D) 0.1 to 20 parts by weight of a curing assistant.

* * * * *